(12) United States Patent
Schmitt et al.

(10) Patent No.: US 10,072,548 B2
(45) Date of Patent: Sep. 11, 2018

(54) METHOD FOR INJECTING REDUCTANT INTO AN EXHAUST GAS OF AN ENGINE

(71) Applicant: Deere & Company, Moline, IL (US)

(72) Inventors: Josh C Schmitt, Waterloo, IA (US); Scott A Chase, Cedar Falls, IA (US); Taner Tuken, Cedar Falls, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 14/868,833

(22) Filed: Sep. 29, 2015

(65) Prior Publication Data

US 2017/0089244 A1 Mar. 30, 2017

(51) Int. Cl.
| | | |
|---|---|---|
| *F01N 11/00* | (2006.01) |
| *F01N 3/035* | (2006.01) |
| *F01N 3/20* | (2006.01) |
| *F01N 13/00* | (2010.01) |
| *F01N 3/10* | (2006.01) |

(52) U.S. Cl.
CPC ............ *F01N 3/208* (2013.01); *F01N 3/035* (2013.01); *F01N 11/002* (2013.01); *F01N 13/0093* (2014.06); *F01N 13/0097* (2014.06); *F01N 3/106* (2013.01); *F01N 3/2066* (2013.01); *F01N 2250/02* (2013.01); *F01N 2610/02* (2013.01); *F01N 2610/146* (2013.01); *F01N 2610/1453* (2013.01); *F01N 2900/0414* (2013.01); *F01N 2900/1404* (2013.01); *F01N 2900/1411* (2013.01); *F01N 2900/1812* (2013.01); *Y02T 10/24* (2013.01)

(58) Field of Classification Search
CPC .... F01N 2610/02; F01N 3/2066; F01N 3/208; F01N 3/0821; F01N 11/002; F01N 13/0093; F01N 13/0097; F01N 3/035; F01N 2250/02; F01N 2610/1453; F01N 2610/146; F01N 2900/0414; F01N 2900/1404; F01N 2900/1411; F01N 2900/1812; F01N 3/106; Y02T 10/24
See application file for complete search history.

(56) References Cited

U.S. PATENT DOCUMENTS

| | | | |
|---|---|---|---|
| 8,789,356 | B2 | 7/2014 | Phillips et al. |
| 8,899,023 | B2 | 12/2014 | Patchett et al. |
| 2009/0056315 | A1 | 3/2009 | Solbrig et al. |

(Continued)

FOREIGN PATENT DOCUMENTS

| | | |
|---|---|---|
| EP | 2578830 A1 | 4/2013 |
| WO | 2009025775 A1 | 2/2009 |

OTHER PUBLICATIONS

European Search Report in foreign counterpart application No. 16190382.8 dated Feb. 9, 2017 (7 pages).

*Primary Examiner* — Brandon Lee (57) ABSTRACT

A method for injecting a reductant into an exhaust gas of a power system. The method includes oscillating injections of the reductant between a higher reductant injection rate and a lower reductant injection rate. The higher injection rate is high enough to result in storage of a decomposed form of the reductant on a selective catalytic reduction on-filter ("SCR+F"), and the lower injection rate being low enough to result in depletion of the decomposed form of the reductant on the SCR+F. The SCR+F includes a diesel particular filter and a selective catalytic reduction catalyst applied thereto.

22 Claims, 5 Drawing Sheets

(56) References Cited

U.S. PATENT DOCUMENTS

2011/0113761 A1* 5/2011 Boorse ................ F01N 3/0222
60/297
2011/0167805 A1* 7/2011 Chen ................... F01N 3/023
60/286
2011/0262329 A1 10/2011 Ofoli et al.

* cited by examiner

METHOD FOR INJECTING REDUCTANT INTO AN EXHAUST GAS OF AN ENGINE

FIELD OF THE DISCLOSURE

The present disclosure relates to a method for injecting reductant into an exhaust gas of a power system.

BACKGROUND OF THE DISCLOSURE

Manufacturers of engines meet set emissions regulations via aftertreatment systems. Tier 3, Interim Tier 4, and Final Tier 4 emissions regulations, for example, required substantial reductions in particulate matter ("PM") and nitrogen oxides ("$NO_x$"). Beyond the Final Tier 4 emissions regulation, drivers for the continued evolution of aftertreatment systems may include more stringent emissions standards; lower ownership costs (in particular, the initial cost of purchase); and more compact, modular solutions. Some aftertreatment systems include a diesel particulate filter for reducing PM and a selective catalytic reduction ("SCR") catalyst for removing $NO_x$. Such systems may have relatively high ownership costs and require relatively large design spaces.

One solution for potentially lowering the costs and minimizing the design spaces of such systems is to instead utilize a selective catalytic reduction on-filter ("SCR+F"). The "SCR+F" includes a diesel particulate filter with a selective catalytic reduction catalyst applied thereto. SCR+F solutions, however, introduce some operational challenges, one of which is that the reactions between the passive regeneration of PM by $NO_x$, and the conversion of $NO_x$ by selective reaction with ammonia ("$NH_3$") are in competition.

SUMMARY OF THE DISCLOSURE

Disclosed is a method for injecting a reductant into an exhaust gas of a power system. The method includes oscillating injections of the reductant between a higher reductant injection rate and a lower reductant injection rate. The higher injection rate is high enough to result in storage of a decomposed form of the reductant on an SCR+F, and the lower injection rate is low enough to result in depletion of the decomposed form of the reductant on the SCR+F. A combination of the higher and lower injection rates may promote passive regeneration of PM in the SCR+F.

BRIEF DESCRIPTION OF THE DRAWINGS

The detailed description of the drawings refers to the accompanying figures in which.

Like reference numerals in the various drawings indicate like elements.

DETAILED DESCRIPTION OF THE DRAWINGS

Figure 1:
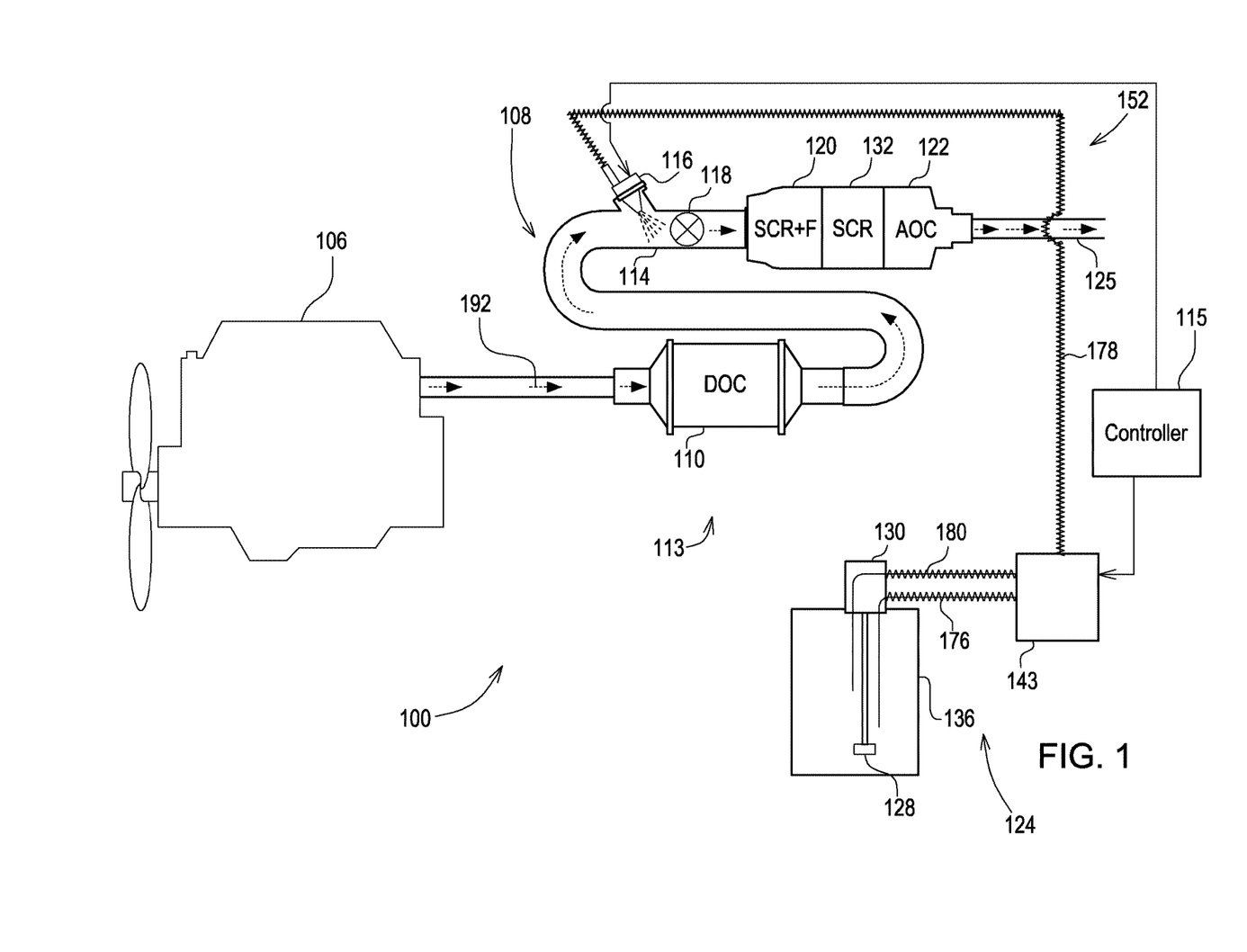
FIG. 1 is a schematic illustration of an example of a power system.

Referring to FIG. 1, there is shown a schematic illustration of a power system 100 for providing power to a variety of machines, including on-highway trucks, construction vehicles, marine vessels, stationary generators, automobiles, agricultural vehicles, and recreational vehicles. An engine 106 of the power system 100 may be any kind that produces an exhaust gas, the exhaust gas and flow direction being indicated by directional arrow 192. The engine 106 may be an internal combustion engine, such as a gasoline engine, a diesel engine, a gaseous fuel burning engine (e.g., natural gas), or any other exhaust gas producing engine. The engine 106 may be of any size, with any number cylinders, and in any configuration (e.g., "V," inline, and radial).

The power system 100 includes an exhaust system 108, having components for directing exhaust gas from the engine 106 to the atmosphere. The exhaust system 108 includes an aftertreatment system 113, and at least some of the exhaust gas passes therethrough. The aftertreatment system 113 removes, for example, PM and $NO_x$ emissions present in the exhaust gas received from the engine 106.

The aftertreatment system 113 is shown having a diesel oxidation catalyst (DOC) 110 and an SCR system 152. The SCR system 152 may include a reductant delivery system 124 followed by an SCR+F 120. The SCR+F 120 includes a DPF and a selective catalytic reduction catalyst applied thereto. Integrating the SCR and the DPF functions into a single component, the SCR+F 120, may aid in reducing costs, meeting packaging constraints, and/or enhancing the performance of the SCR system 152.

As illustrated, the SCR+F 120 may be followed by, for example, an $NH_3$ oxidation catalyst ("AOC") 122 and a secondary SCR catalyst 132, which may be either separate or integral relative to one another. Alternative embodiments of the aftertreatment system 113—to name just a few examples—may include (1) a DOC 110 followed by an SCR+F 120, but without a secondary SCR catalyst 132 and without an AOC 122, or (2) a DOC 110 followed by an SCR+F 120 followed by a secondary SCR catalyst 132, but without an AOC 122, or (3) an SCR+F 120 with an AOC coated directly on a backside thereof, but without a secondary SCR catalyst 132.

The exhaust gas flows through each component of the aftertreatment system 113, and after being treated, is expelled into the atmosphere via a tailpipe 125. Exhaust gas exiting therefrom has significantly fewer pollutants—such as PM, $NO_x$, and hydrocarbons—than an untreated exhaust gas would have.

The DOC 110 may be configured in a variety of ways and contain catalyst materials useful in collecting, absorbing, adsorbing, and/or converting hydrocarbons, carbon monoxide, and/or oxides of nitrogen contained in the exhaust gas. Such catalyst materials may include, for example, aluminum, platinum, palladium, rhodium, barium, cerium, and/or alkali metals, alkaline-earth metals, rare-earth metals, or combinations thereof. The DOC 110 may include, for example, a ceramic substrate, a metallic mesh, foam, or any other porous material known in the art, and the catalyst materials may be located on, for example, a substrate of the DOC 110. The DOC 110 may also oxidize NO contained in the exhaust gas, thereby converting it to $NO_2$ upstream of the SCR+F 120.

The reductant delivery system 124 may include a reductant tank 136 for storing the reductant. One example of a reductant is a solution having 32.5% high purity urea and 67.5% deionized water (e.g., DEF), which decomposes as it travels through a decomposition tube 114 to produce ammonia.

The reductant delivery system 124 may include a reductant header 130 mounted to the reductant tank 136, the reductant header 130 further including, in some embodiments, a level sensor 128 for measuring a quantity of the reductant in the reductant tank 136. The level sensor 128 may include a float configured to float at a liquid, air surface interface of reductant included within the reductant tank 136.

The decomposition tube 114 may be positioned downstream of the reductant injector 116 but upstream of the SCR+F 120. The reductant injector 116 may be, for example, an injector that is selectively controllable to inject reductant directly into the exhaust gas. As shown, the SCR system 152 may include a reductant mixer 118 that is positioned upstream of the SCR+F 120 and downstream of the reductant injector 116. To increase the injection rate of the reductant, the reductant injector 116 may remain open for a longer period of time during each opening thereof. And decrease it, the reductant injector 116 may remain open for a shorter period of time during each opening thereof.

The reductant delivery system 124 may additionally include a reductant pressure source and a reductant extraction passage 176. The extraction passage 176 may be coupled fluidly to the reductant tank 136 and the reductant pressure source therebetween. The reductant delivery system 124 may further include a reductant supply module 143. A controller 115 may control the reductant supply module 143 and, thus, the injection rate of the reductant injector 116.

The controller 115 may be an engine control unit ("ECU") or engine control module ("ECM") that controls various elements of the power system 100, including the timing duration and phasing of fuel injectors, or another controller. The controller 115 may be communicatively connected with other components of the power system 100, such as a high pressure fuel pump, an exhaust gas recirculation system, and/or the aftertreatment system 113 for monitoring and controlling various functions thereof. In some embodiments, the controller 115 may be part of a controller area network ("CAN"), in which the controller 115, sensors, and actuators of the power system 100 communicate via digital CAN messages.

The reductant delivery system 124 may also include a reductant dosing passage 178 and a reductant return passage 180. The return passage 180 is shown extending into the reductant tank 136, though in some embodiments of the power system 100, the return passage 180 may be coupled to a return tube via the reductant header 130. And the reductant delivery system 124 may have—among other things—valves, orifices, sensors, and pumps positioned in the extraction passage 176, reductant dosing passage 178, and return passage 180.

As discussed above, the reductant decomposes as it travels through the decomposition tube 114 and produces $NH_3$. The $NH_3$ reacts with NO in the presence of the SCR+F 120, and it reduces the NO to less harmful emissions, such as $N_2$ and $H_2O$. The SCR+F 120 may be any of various catalysts known in the art. For example, in some embodiments, the SCR+F 120 may be a vanadium-based catalyst. But in others, it may be a zeolite-based catalyst, such as a Cu-zeolite or a Fe-zeolite.

The AOC 122 may be any of various flowthrough catalysts for reacting with $NH_3$ and thereby produce nitrogen. Generally, the AOC 122 is utilized to remove $NH_3$ that has slipped through or exited the SCR+F 120.

In an SCR+F 120, the reactions between the passive regeneration of PM by $NO_x$, and the conversion of $NO_x$ by selective reaction with the reductant are in competition. This is because successful passive regeneration of PM requires adequate $NO_2$ levels, but simultaneously the $NO_2$ levels are being reduced via reactions with $NH_3$. At mid to high temperatures, the $NO_2$ reductions in the SCR+F 120 may happen much more quickly than the $NO_2$ oxidizes the PM. And if this occurs, the $NO_2$ may be reduced so quickly in the upstream portions of the SCR+F 120 that $NO_2$ is not available to oxidize with the PM.

Figure 2:
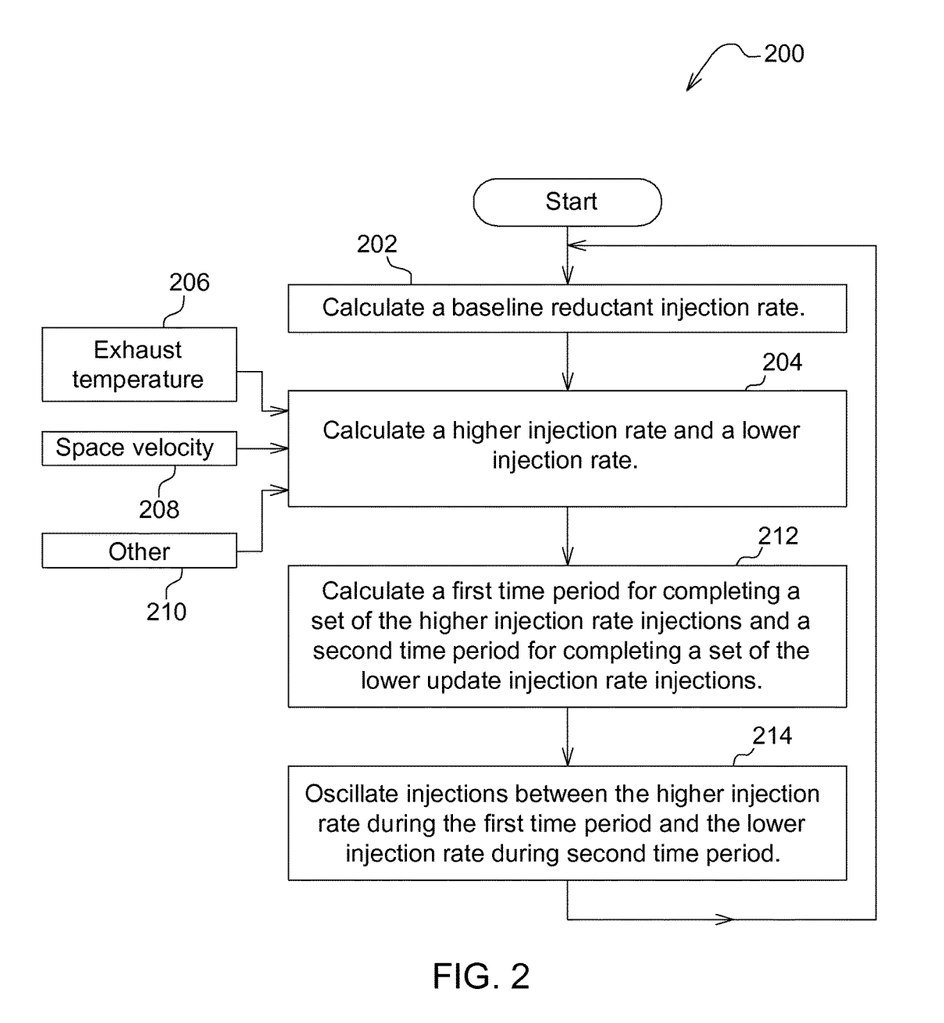
FIG. 2 is an example of a method for injecting a reductant.

Shown in FIG. 2 is a method 200 for injecting reductant into the exhaust gas exiting from the engine 106. The method 200 may pacify the competition between the passive regeneration of PM by $NO_x$, and the conversion of NO by selective reactions with the reductant.

In act 202, the controller 115 may calculate a baseline reductant injection rate for a given period of time. The baseline injection rate may be based on a physical state of the power system 100, or based on controlling a physical state of the power system 100. For example, it may be based on a NO value in the aftertreatment system 113 and may be in the form of grams per second. Further, the baseline injection rate may be a transient rate, depending on the NO levels in the exhaust gas, the space velocity, the exhaust gas flow, a catalyst temperature, or a stored amount of $NH_3$.

In act 204, the controller 115 may calculate the higher reductant injection rate and the lower reductant injection rate based on, for example, the baseline injection rate, an exhaust temperature 206, a space velocity 208, a pressure, a temperature, and/or some other value 210. The higher injection rate is high enough to result in storage of a decomposed form of the reductant on the SCR+F 120, and the lower injection rate is low enough to result in depletion of the decomposed form of the reductant on the SCR+F 120.

In some embodiments of the method 200, the higher injection rate may be just a single higher injection rate or one of a plurality of higher injection rates. In the case of a single higher injection rate, for example, the baseline injection rate may be 0.1 grams per second, and the higher injection rate may be repeated as 0.11 grams per second. In the case of a plurality of higher injection rates, in contrast, the baseline injection rate may again be 0.1 grams per second, but the higher injection rate may vary between different values above 0.1 grams per second (e.g., (1) increase linearly from the baseline injection rate to the higher injection rate for half the period, and decrease linearly from the higher injection rate to the baseline injection rate for the second half of the period; or (2) follow the course of half a sine-wave, starting at the baseline injection rate, approaching the higher injection rate at half the period, and falling back to the baseline injection rate at the end of the period). The same methodologies may also be used with respect to the lower injection rate(s).

The exhaust temperature 206 may be a temperature related to the SCR+F 120, the AOC 122, or the secondary SCR catalyst 132, or anywhere in the aftertreatment system 113. The exhaust temperature 206 may be a measured temperature or a calculated temperature.

The space velocity 208 may be a space velocity 208 of the SCR+F 120, the AOC 122, the secondary SCR catalyst 132, or of other components in the aftertreatment system 113. The space velocity 208 may be an exhaust volumetric flow rate divided by the volume of the component (e.g., how many times per unit time an entire volume of exhaust gas is replaced therein). One unit that may be used for space velocity 208 is 1000 s of times per hour (i.e., k/hr).

The other value 210 may be, for example, a $NO_x$ concentration value, a humidity value, an ambient temperature value, a load value, a speed value, or any other physical state of the engine 106 that is available to the controller 115. These values may be measured, modeled, or calculated, just to name a few examples.

In act 212, the controller 115 may calculate a first time period for completing a set of the higher injection rate injections, and a second time period for completing a set of the lower injection rate injections. In such an embodiment, the sets are in immediate sequence relative to one another. The length of the first time period and the second time period may be equal in some embodiments, but different in other embodiments, depending on the need to pacify the competition between passive regeneration and reduction of $NO_x$ with the reductant. In some embodiments, in act 212, the controller 115 may calculate the first and second time periods based on the exhaust temperature 206, the space velocity 208, or some other value 210. In other embodiments, the controller 115 may calculate the first and second time periods based on other values available thereto.

In act 214, the controller 115 may oscillate injections between the higher injection rate during the first time period, and the lower injection rate during the second time period. In act 214, the oscillating may include injecting the reductant upstream of the SCR+F 120 (i.e., upstream of the DPF's functionality), the AOC 122, and the secondary SCR catalyst 132. In some operating modes of method 200, an average injection rate of a combination of the higher injection rate and the lower injection rate may be substantially equal to the reductant injection rate (e.g., within +/−20%).

As the method 200 repeats, the controller 115 may increase a difference between the higher injection rate and the baseline injection rate when the space velocity 208 decreases. Alternatively or in addition to, the controller 115 may also increase a difference between the baseline injection rate and the lower injection rate when the space velocity 208 decreases. Such increases in the difference may be calculated in act 204 and then implemented in act 214. In some operating modes the differences may already bounded (i.e., too high or low), resulting in a hold, in contrast to an increase or decrease.

Alternatively, as the method 200 repeats, the controller 115 may decrease a difference between the higher injection rate and the baseline injection rate when a space velocity 208 increases. Alternatively or in addition to, the controller 115 may decrease a difference between the baseline injection rate and the lower injection rate when the space velocity 208 increases. Similar to above, such decreases may be calculated in act 204 and then implemented in act 214.

Figure 3:
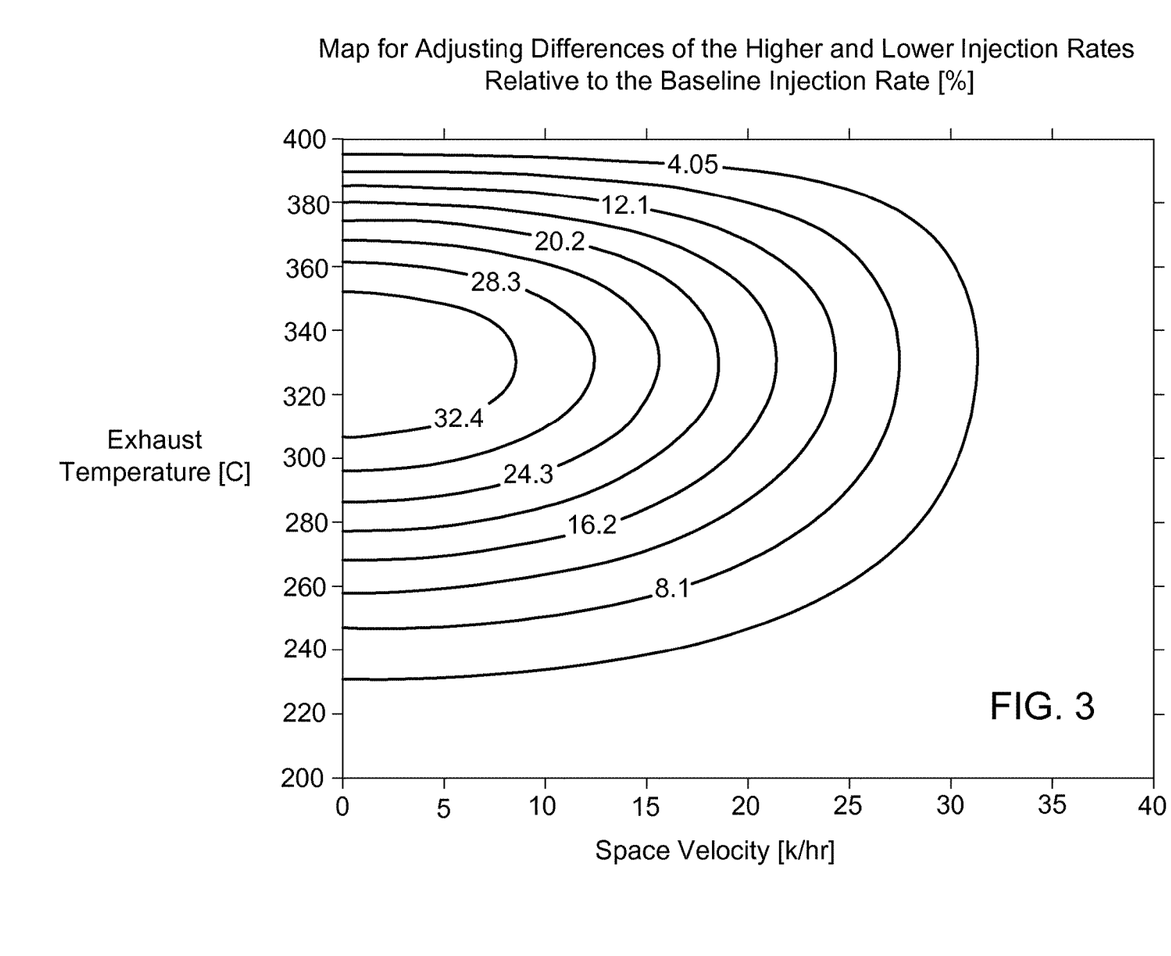
FIG. 3 is an example of a map for adjusting a difference between higher and lower reductant injection rates relative to a baseline reductant injection rate.

An illustration of a map for adjusting the differences is shown in in FIG. 3. To give just one example of an adjustment, as the space velocity 208 increases from around 10 k/hr to 30 k/hr at an exhaust temperature 206 of around 330° C., the difference decreases from around 32% to around 4%. In such an example, if the baseline injection rate is 0.1 g/sec, then the higher and lower injection rates may be 32% higher and lower in the initial mode, but only 4% high and lower in the next mode. The map in FIG. 3 is just one illustrative approach for setting and adjusting the differences. Such a map may be stored in the controller 115.

As the method 200 repeats, the controller 115 may increase the first and second time periods when the exhaust temperature 206 decreases, or alternatively decrease the first and second time periods when the exhaust temperature 206 increases. Such increases and decreases may be calculated in act 204 and implemented in act 214. In some operating modes the time period may already be bounded (i.e., too short or long), resulting in a hold, in contrast to an increase or decrease.

Figure 4:
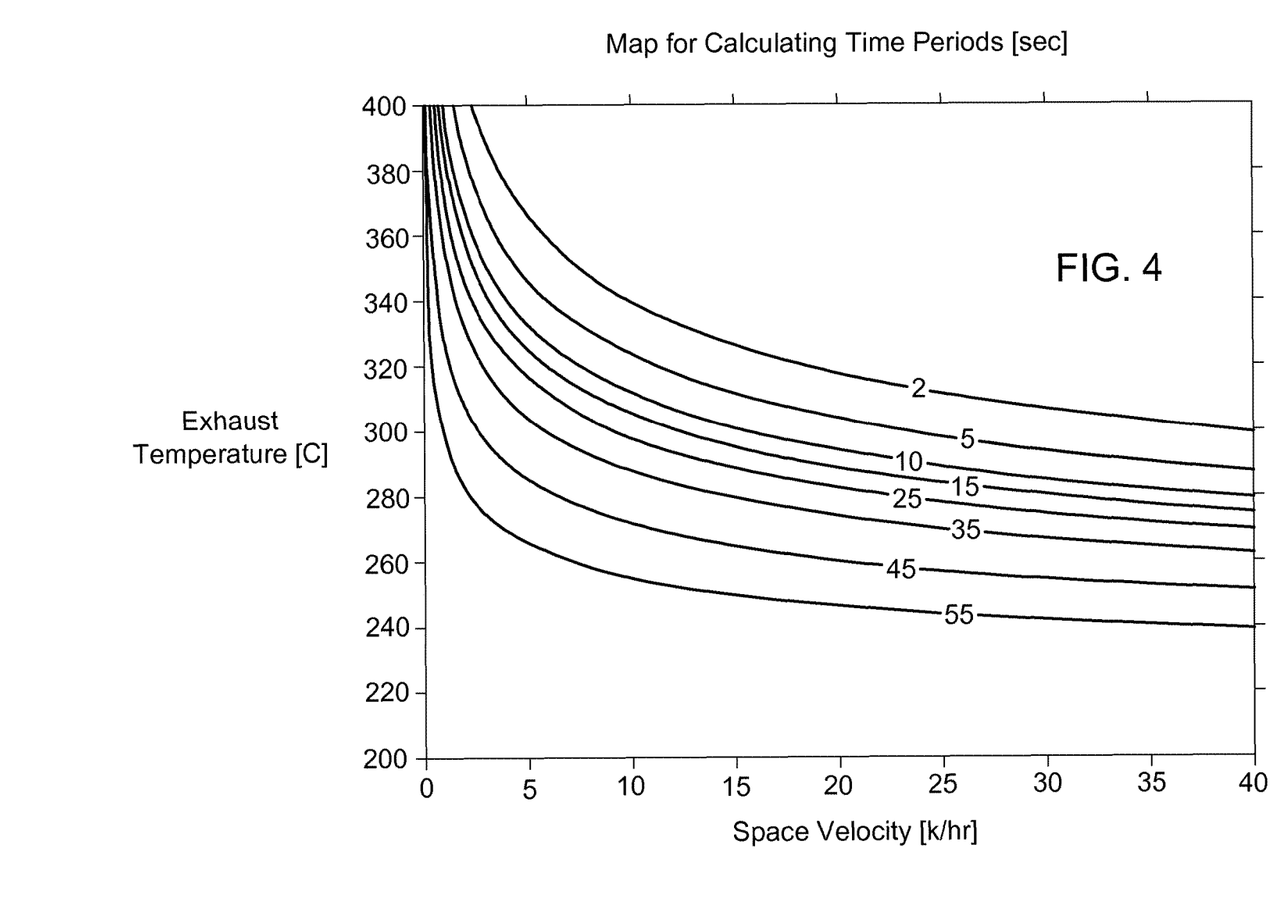
FIG. 4 is an example of a map for calculating the first and second time periods.

An illustration of a map for adjusting the time periods is shown in FIG. 4. To give just one example of an adjustment, as the exhaust temperature 206 increases from around 250° C. to around 330° C. at a space velocity 208 of around 20 k/hr, the time period may decrease from around 55 seconds to around 2 seconds.

Still further, as the method 200 repeats, the controller 115 may increase the first and second time periods when the space velocity 208 decrease, and it may decrease the first and second time periods when the space velocity 208 increases. Such increases and decreases may be calculated in act 204 and implemented in act 214. In some operating modes the time period may be already bounded (i.e., too short or long), resulting in a hold, in contrast to an increase or decrease. The map in FIG. 4 is just one illustrative approach for setting and adjusting the time periods based on the space velocity 208. Such a map may be stored in the controller 115.

Figure 5:
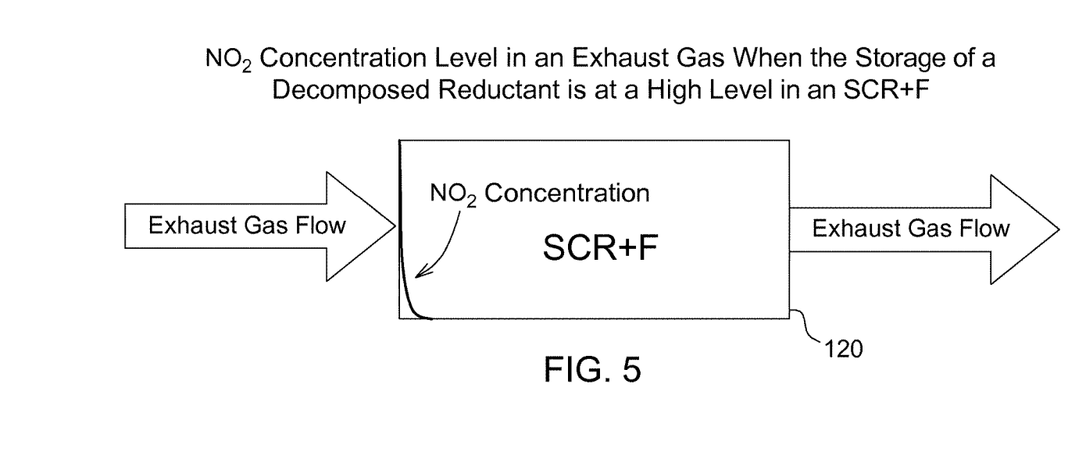
FIG. 5 is an illustration of an $NO_2$ concentration level, in an exhaust gas, when the storage of a decomposed reductant, in an SCR+F, is at a higher level.

Referring to FIG. 5, there is shown a simplified illustration of an $NO_2$ concentration level, in the exhaust gas, when the storage of a decomposed reductant, in the SCR+F 120, is at a relatively high level. The $NO_2$ concentration level is an exaggerated representation of the $NO_2$ concentration level at a given position within the SCR+F 120 (i.e., higher at the upstream portions and then descending). As discussed above, one example of a reductant is a solution having 32.5% high purity urea and 67.5% deionized water (e.g., DEF), which decomposes as it travels through the decomposition tube 114 to produce $NH_3$. A washcoat of the SCR+F 120 may absorb the $NH_3$, and dampen the changes in the $NH_3$ concentration and $NO_x$ conversion levels.

As shown in FIG. 5, when the storage of the ammonia, for example, on the SCR+F 120 is high, the $NO_2$ concentration may be reduced primarily in an upstream portion of the SCR+F 120. The operating modes shown in FIG. 5 may occur when, for example, the reductant is injected at the higher injection rate for some period of time in act 214.

One purpose of the SCR+F 120, and the aftertreatment system 113 in general, is to reduce $NO_2$. However, in the operating mode shown in FIG. 5, this reduction happens so quickly that $NO_2$ may not be available in the middle and downstream portions of the SCR+F 120 to passively reduce soot levels. Operating the SCR+F 120 continuously in this mode may require an active regeneration thereof, which may increase fuel use and interfere with the standard operation of the power system 100. Despite this drawback, the higher injection rate may be useful for storing $NH_3$ on the SCR+F 120 when the SCR+F 120 is depleted thereof.

Figure 6:
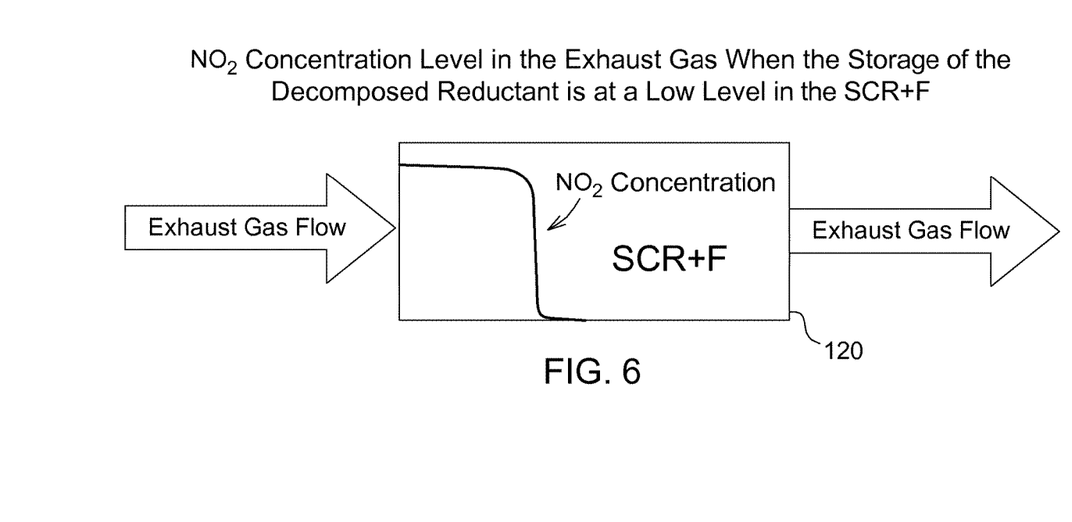
FIG. 6 is an illustration of the $NO_2$ concentration level, in the exhaust gas, when the storage of the decomposed reductant, in the SCR+F, is at a lower level.

In contrast, referring to FIG. 6, there is shown a simplified illustration of the $NO_2$ concentration level, in the exhaust gas, when the storage of the decomposed reductant (e.g., $NH_3$), in the SCR+F 120, is at a relatively low level.

The operating modes shown in FIG. 6 may occur when the reductant is injected at the lower injection rate for some period of time in act 214. For example, if the reductant is injected at a lower injection rate, the stored $NH_3$ begins to deplete on the upstream portion of the SCR+F 120 and so on. When the $NH_3$ is depleted on the upstream portion of the SCR+F 120, the $NO_2$ in the exhaust gas may passively regenerate the soot on the SCR+F 120 along that portion (e.g., the portion in FIG. 6 where the NO₂ concentration is high). The NH₃ stored on the middle and downstream portions of the SCR+F 120 then reacts with and quickly reduces the NO₂. Ultimately, by injecting the reductant at the lower injection rate, the NO₂ may penetrate a longer portion of the SCR+F 120, promote passive regeneration, and minimize the need for active regenerations.

Referring back to FIG. 3, increasing the differences of the higher and lower injection rates relative to the baseline injection rate may be particularly beneficial at lower space velocities and between exhaust temperatures of 275° C. and 380° C. This is, in part, because (1) passive regeneration may occur at such temperatures as the NH₃ is depleted from the SCR+F 120 when the reductant is injected at the lower injection rate for some period of time, and because (2) such temperatures are not so high as to cause the rapid release of NH₃ from the SCR+F 120. Decreasing the differences of the higher and lower injection rates relative to the baseline injection rate may not be as beneficial at temperatures outside of this range and/or at higher space velocities. In such scenarios, the reductant may be injected closer to the baseline injection rate, so as to focus on NO$_x$ reduction throughout the length of the SCR+F 120, and to wait for better opportunities for passively regenerating the SCR+F 120.

Referring back to FIG. 4, shorter first and second time periods may be beneficial at higher space velocities. This because the flow rate of NO$_x$ and NH₃ increases, as compared to the amount of NH₃ stored on the SCR+F 120. This quickens the dynamic response of the SCR+F 120. At higher space velocities, the NO₂ reduction front will progress from the front to the back of the SCR+F 120 more quickly. The same is also true of the NH₃ storage. For similar but opposite reasons, longer first and second time periods may be beneficial at lower space velocities.

Shorter first and second time periods may be more appropriate at higher exhaust temperatures. This is because the NH₃ storage on the SCR+F 120 decreases as the catalyst temperature increases. This decreases the amount of stored NH₃, and fundamentally quickens the dynamic response of the SCR+F 120. The same is also true of the NH₃ storage. For similar but opposite reasons, longer first and second time periods may be more beneficial at higher space velocities.

Though not shown in FIG. 4, shorter first and second time periods may also be more appropriate at higher NO$_x$ concentrations. This is because increases in the NO$_x$ concentration then increase the rate at which NO$_x$ flows through the SCR+F 120 relative to the amount of NH₃ stored thereon. The dynamic effect is similar to increasing the space velocity 208 and exhaust temperature 206, in that it quickens the dynamic response of the SCR+F 120.

While the disclosure has been illustrated and described in detail in the drawings and foregoing description, such illustration and description is to be considered as exemplary and not restrictive in character, it being understood that illustrative embodiments have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

What is claimed is:

1. A method for injecting a reductant into an exhaust gas of a power system, the method comprising:
    calculating a higher reductant injection rate based on a baseline reductant injection rate, the higher reductant injection rate being higher than the baseline reductant injection rate;
    calculating a lower reductant injection rate based on the baseline reductant injection rate, the lower reductant injection rate being lower the baseline reductant injection rate, an average reductant injection rate of a combination of the higher reductant injection rate and the lower reductant injection rate being substantially equal to the baseline reductant injection rate; and
    oscillating injections of the reductant between the higher reductant injection rate and the lower reductant injection rate in order to promote passive regeneration of particulate matter in a selective catalytic reduction on-filter ("SCR+F"), a reductant injector being periodically open during operation at both the higher reductant injection rate and during the lower reductant injection rate, the higher reductant injection rate being high enough to result in storage of a decomposed form of the reductant on the SCR+F, the lower reductant injection rate being low enough to result in depletion of the decomposed form of the reductant on the SCR+F, the SCR+F comprising a diesel particular filter and a selective catalytic reduction catalyst applied thereto.

2. The method of claim 1, further comprising calculating the higher and lower reductant injection rates based on one or more physical states of the power system.

3. The method of claim 1, further comprising calculating the higher and lower reductant injection rates based on an exhaust temperature.

4. The method of claim 1, further comprising calculating the higher and lower reductant injection rates based on a space velocity.

5. The method of claim 1, further comprising
    calculating the baseline reductant injection rate.

6. The method of claim 5, further comprising increasing a difference between the higher reductant injection rate and the baseline reductant injection rate when a space velocity decreases.

7. The method of claim 5, further comprising increasing a difference between the baseline reductant injection rate and the lower reductant injection rate when a space velocity decreases.

8. The method of claim 5, further comprising decreasing a difference between the higher reductant injection rate and the baseline reductant injection rate when a space velocity increases.

9. The method of claim 5, further comprising decreasing a difference between the baseline reductant injection rate and the lower reductant injection rate when a space velocity increases.

10. The method of claim 1, further comprising:
    calculating a first time period for completing a set of injections at the higher reductant injection rate; and
    calculating a second time period for completing a set of injections at the lower reductant injection rate, the sets being in immediate sequence.

11. The method of claim 10, further comprising decreasing the first and second time periods when an exhaust temperature increases.

12. The method of claim 10, further comprising increasing the first and second time periods when an exhaust temperature decreases.

13. The method of claim 10, further comprising decreasing the first and second time periods when a space velocity decreases.

14. The method of claim 10, further comprising increasing the first and second time periods when a space velocity increases.

15. The method of claim 1, wherein the higher reductant injection rate is one of a plurality of higher reductant injection rates, the lower reductant injection rate is one of a plurality of lower reductant injection rates, and the method further comprises:
calculating a first time period for completing a first set of injections at the higher reductant injection rates; and
calculating a second time period for completing a second set of injections at the lower reductant injection rates.

16. The method of claim 15, further comprising
calculating the baseline reductant injection rate.

17. The method of claim 15, further comprising increasing the first and second time periods when an exhaust temperature decreases.

18. The method of claim 15, further comprising decreasing the first and second time periods when an exhaust temperature increases.

19. The method of claim 15, further comprising increasing the first and second time periods when a space velocity decreases.

20. The method of claim 15, further comprising decreasing the first and second time periods when a space velocity increases.

21. A method for injecting a reductant into an exhaust gas with a reductant injector upstream of a selective catalytic reduction on-filter ("SCR+F"), the SCR+F comprising a diesel particular filter and a selective catalytic reduction catalyst applied thereto, the method comprising:
determining a higher reductant injection rate, the higher reductant injection rate being high enough to result in storage of a decomposed form of the reductant on the SCR+F;
determining a first time period for completing a first set of injections at the higher reductant injection rates;
determining a lower reductant injection rate, the lower reductant injection rate being low enough to result in depletion of the decomposed form of the reductant on the SCR+F;
determining a second time period for completing a second set of injections at the lower reductant injection rates; and
oscillating injections of the reductant between the higher reductant injection rate for the first time period and the lower reductant injection rate for the second time period in order to promote passive regeneration of particulate matter in the SCR+F, the reductant injector being periodically open during operation at both the higher reductant injection rate and at the lower reductant injection rate.

22. The method of claim 21, wherein the higher reductant injection rate is higher than a baseline reductant injection rate, the lower reductant injection rate is lower than the baseline reductant injection rate, and an average reductant injection rate of a combination of the higher reductant injection rate and the lower reductant injection rate is substantially equal to the baseline reductant injection rate.

* * * * *